(12) United States Patent
Sato et al.

(10) Patent No.: US 10,878,643 B2
(45) Date of Patent: Dec. 29, 2020

(54) MULTI-SENSOR MANAGEMENT SYSTEMS FOR ADAS

(71) Applicants: DENSO International America, Inc., Southfield, MI (US); DENSO CORPORATION, Kariya (JP)

(72) Inventors: Miki Sato, Novi, MI (US); Ting-yu Lai, Northville, MI (US); Markos Gerges, Sterling Heights, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 82 days.

(21) Appl. No.: 16/039,627

(22) Filed: Jul. 19, 2018

(65) Prior Publication Data
US 2020/0027286 A1   Jan. 23, 2020

(51) Int. Cl.
*G07C 5/08* (2006.01)
*G01S 7/497* (2006.01)
*H04N 17/00* (2006.01)
*G01S 7/52* (2006.01)
*G01S 7/40* (2006.01)

(52) U.S. Cl.
CPC .............. *G07C 5/0808* (2013.01); *G01S 7/40* (2013.01); *G01S 7/497* (2013.01); *G01S 7/52004* (2013.01); *H04N 17/002* (2013.01)

(58) Field of Classification Search
CPC ...... G07C 5/0808; H04N 17/002; G01S 7/40; G01S 7/52004; G01S 7/497
See application file for complete search history.

(56) References Cited

U.S. PATENT DOCUMENTS

| 7,102,496 B1 | 9/2006 | Ernst, Jr. et al. | |
| 2019/0049958 A1* | 2/2019 | Liu | G01S 13/865 |
| 2019/0293462 A1* | 9/2019 | Choi | G06N 3/08 |

* cited by examiner

*Primary Examiner* — Anne Marie Antonucci
(74) *Attorney, Agent, or Firm* — Brooks Kushman, P.C.

(57) ABSTRACT

A vehicle sensor system for providing data for performance of vehicle features may include a plurality of sensors arranged on a vehicle, each sensor having a sensor profile, a memory configured to maintain the sensor profile, and a controller in communication with the plurality of sensors and memory and configured to receive data from each of the plurality of sensors in order at least one vehicle feature, detect a failure of a first sensor in which the first sensor fails to provide sensor data necessary to provide the vehicle feature, and use sensor data received from the second sensor to provide the vehicle feature in response to the sensor profile of the second sensor including a required attribute of the first sensor.

17 Claims, 7 Drawing Sheets

MULTI-SENSOR MANAGEMENT SYSTEMS FOR ADAS

TECHNICAL FIELD

Disclosed herein are multi-sensor management systems for ADAS.

BACKGROUND

In connection with vehicle advanced driver assistance systems (ADAS), vehicles include various sensors within and on the exterior of the vehicle. These sensors may provide data that may be used by various vehicle systems to provide features to the user such as park assist, bird-eye views, pedestrian protection systems, etc.

SUMMARY

A vehicle sensor system for providing data for performance of vehicle features may include a plurality of sensors arranged on a vehicle, each sensor having a sensor profile, a memory configured to maintain the sensor profile, and a controller in communication with the plurality of sensors and memory and configured to receive data from each of the plurality of sensors to provide at least one vehicle feature, detect a failure of a first sensor in which the first sensor fails to provide sensor data necessary to provide the vehicle feature, and use sensor data received from the second sensor to provide the vehicle feature in response to the sensor profile of the second sensor including a required attribute of the first sensor.

A non-transitory computer-readable medium tangibly embodying computer readable instructions for a software program, the software program being executable by a processor of a computing device to provide operations may include receiving receive data from each of a plurality of sensors to provide at least one vehicle feature, detecting a failure of a first sensor in which the first sensor fails to provide sensor data necessary to provide the vehicle feature, and use sensor data received from the second sensor to provide the vehicle feature in response to the sensor profile of the second sensor including the required attribute.

A method may include receiving receive data from each of a plurality of sensors to provide at least one vehicle feature, detecting a failure of a first sensor in which the first sensor fails to provide sensor data necessary to provide the vehicle feature, and use sensor data received from the second sensor to provide the vehicle feature in response to the sensor profile of the second sensor including the required attribute.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a vehicle advanced driver assistance systems (ADAS) utilizing data from a sensor upon failure of another sensor. Each sensor may have a sensor profile including attributes and information for that sensor. For example, the sensor profile may include attributes of that sensor such as the sensor's field of view, information type and vehicle function type that the sensor is used for. The function type may include functionality of the sensors such as object detection, road condition recognition, etc. Each function type may include information type which describes the information provided by the sensor (e.g., acceleration). Data supplied by the sensors may be used to facilitate vehicle features such as park assist features, rear camera views, birds eye views, collision avoidance systems, pedestrian protection systems, etc.

However, when one or more of the sensors fail, the sensor may not be capable of providing the data necessary for the vehicle feature. The ADAS application disclosed herein, upon detecting a failed sensor, may query other sensors to determine whether these sensors could provide the data typically provided by the failed sensor in order to maintain the vehicle feature capabilities. The ADAS application may do this by comparing the attributes of the failed sensor with those of the other sensors, as defined by the sensor profiles. If at least one attribute of the failed sensor matches with an attribute of another functioning sensor, then the application may use the data of the other sensor to accomplish the vehicle feature.

Figure 1:
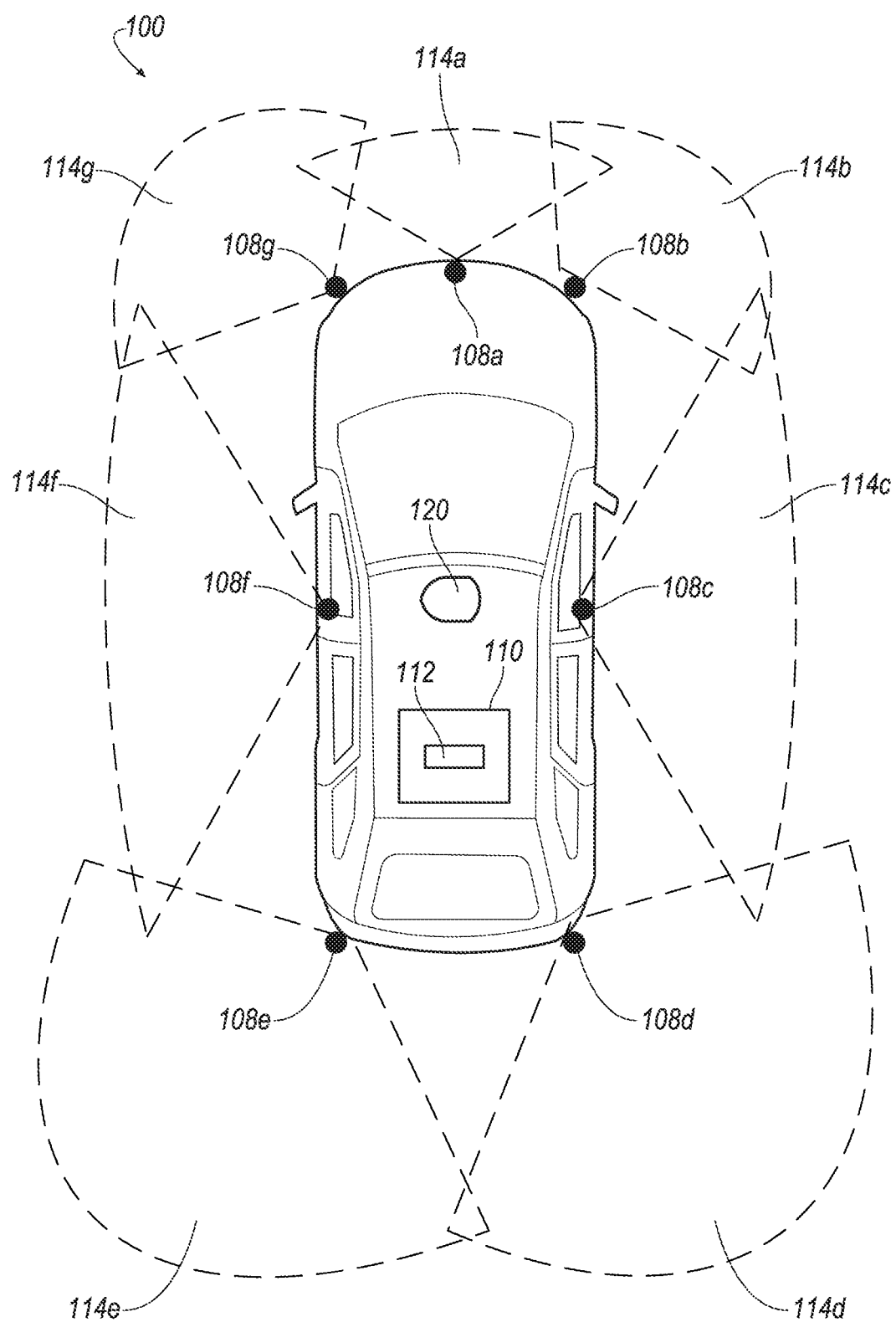
FIG. 1 an example ADAS including a multi-sensor management system within a vehicle.

FIG. 1 illustrates an example ADAS 100 including an ADAS application 110 within a vehicle 102. The ADAS 100 may include a plurality of sensors 108a-108g (collectively referred to as sensors 108). The sensors 108 may include various cameras, LIDAR sensors, radar sensors, ultrasonic sensors, or other sensors for detecting information about the surroundings of the vehicle, including, for example, other vehicles, lane lines, guard rails, objects in the roadway, buildings, pedestrians, etc. Each of the sensors 108 may be arranged at a location around the vehicle 102 and each sensor 108a-f may be associated with a field of view 114a-f (generally and collectively referred to as field of view 114). The field of view 114 may include a view or area for which the sensor is capable of detecting. The field of view 114 may be defined by a sensor profile associated with each sensor 108. The sensor profile is discussed in more detail below with respect to FIG. 3.

The sensors 108 may be in communication with the ADAS application 110. The ADAS application 110 may be included in a controller 112. The controller 112 may be a vehicle controller such as an electronic control unit (ECU). The controller 112 may be embodied in a processor configured to carry out instructions for the methods and systems described herein. The controller 112 may include a memory (not individually shown in FIG. 1), as well as other components specific processing within the vehicle. The controller 112 may be one or more computing devices such as a quad core processor for processing commands, such as a computer processor, microprocessor, or any other device, series of devices or other mechanisms capable of performing the operations discussed herein. The memory may store instructions and commands. The instructions may be in the form of software, firmware, computer code, or some combination thereof. The memory may be in any form of one or more data storage devices, such as volatile memory, non-volatile memory, electronic memory, magnetic memory, optical memory, or any other form of data storage device. In one example, the memory may include 2 GB DDR3, as well as other removable memory components such as a 128 GB micro SD card.

The sensors 108 may provide sensor data to the application 110. The application 110 may in turn use the data to generate certain vehicle features such as park assist features, blind spot detection features, birds eye view, etc. The application 110 may communicate with the sensors 108 via a wired or wireless communication. The application 110 may also communicate with other vehicle systems such as a vehicle display 120.

The vehicle display 120 may include a visual display within the vehicle center consol. The display 120 may be a heads-up display, a dash board display, etc. The display 120 may display certain user interfaces and images related to the sensor data supplied to the controller 112. For example, the display 120 may display a bird's eye view, display certain warnings or alerts related to park assist features, etc.

The ADAS application 110 may receive data from the sensors 108. The ADAS application 110 may also detect a failure in one of the sensors 108. The ADAS application 110 may detect a failure when data is not received from one of the sensors 108. That is, one of the sensors 108 fails to transmit the sensor data to the application 110. The ADAS application 110 may also detect sensor failure when corrupt, incomplete, or inaccurate. Such failures may be detected via hardware diagnosis.

Figure 2:
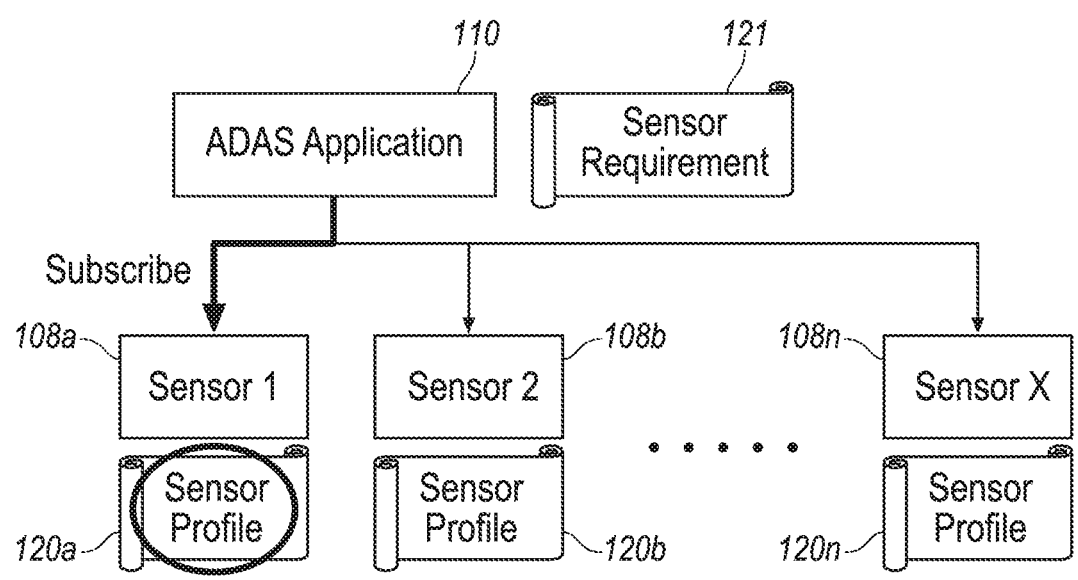
FIG. 2 illustrates an example block diagram for the ADAS application of FIG. 1.

If the ADAS application 110 detects a sensor failure, the ADAS application may determine whether another sensor 108 provides similar sensor data to the ADAS. For example, if the first sensor 108a fails, then the second sensor 108b may provide data similarly provided by the first sensor 108a. In this example, the second sensor 108b may provide field of view data previously provided by the first sensor 108. This process is described in more detail below with respect to FIGS. 2-4. FIG. 2 illustrates an example block diagram for the ADAS application 110. As explained above, the application 110 may communicate with the sensors 108 to receive sensor data. Each sensor 108 may have a sensor profile 122 associated therewith. The sensor profile 122 is described in greater detail below with respect to FIG. 3.

Each of the sensors 108 may communicate the sensor data to the application 110. However, occasionally a sensor 108 may fail to communicate the necessary data to the application 110. In the example shown in FIG. 2, the first sensor 108a may fail. In this situation, the application 110 may be unable to effectively perform certain functions and therefore be unable to provide certain information and certain features such as park assist, birds eye view, etc., to the driver. In order to maintain functionality of these features, the application 110 may attempt to gather the data that would have been provided by the failed sensor 108a, from other sensors. However, some sensors may not be capable of providing the data. In order to find a sensor capable of providing the data, the application 110 may compare the sensor profile 120a of the failed sensor 108a with the sensor profiles of the current functioning sensors. That is, the application 110 may compare the first sensor profile 120a with the second sensor profile 120b, and so on, through the $n^{th}$ sensor profile 120n. If one of the other sensor profiles 120b-120n are similar to that of the failed sensor 120a, then the application 110 may use the sensor data provided by that associated sensor.

Figure 3A:
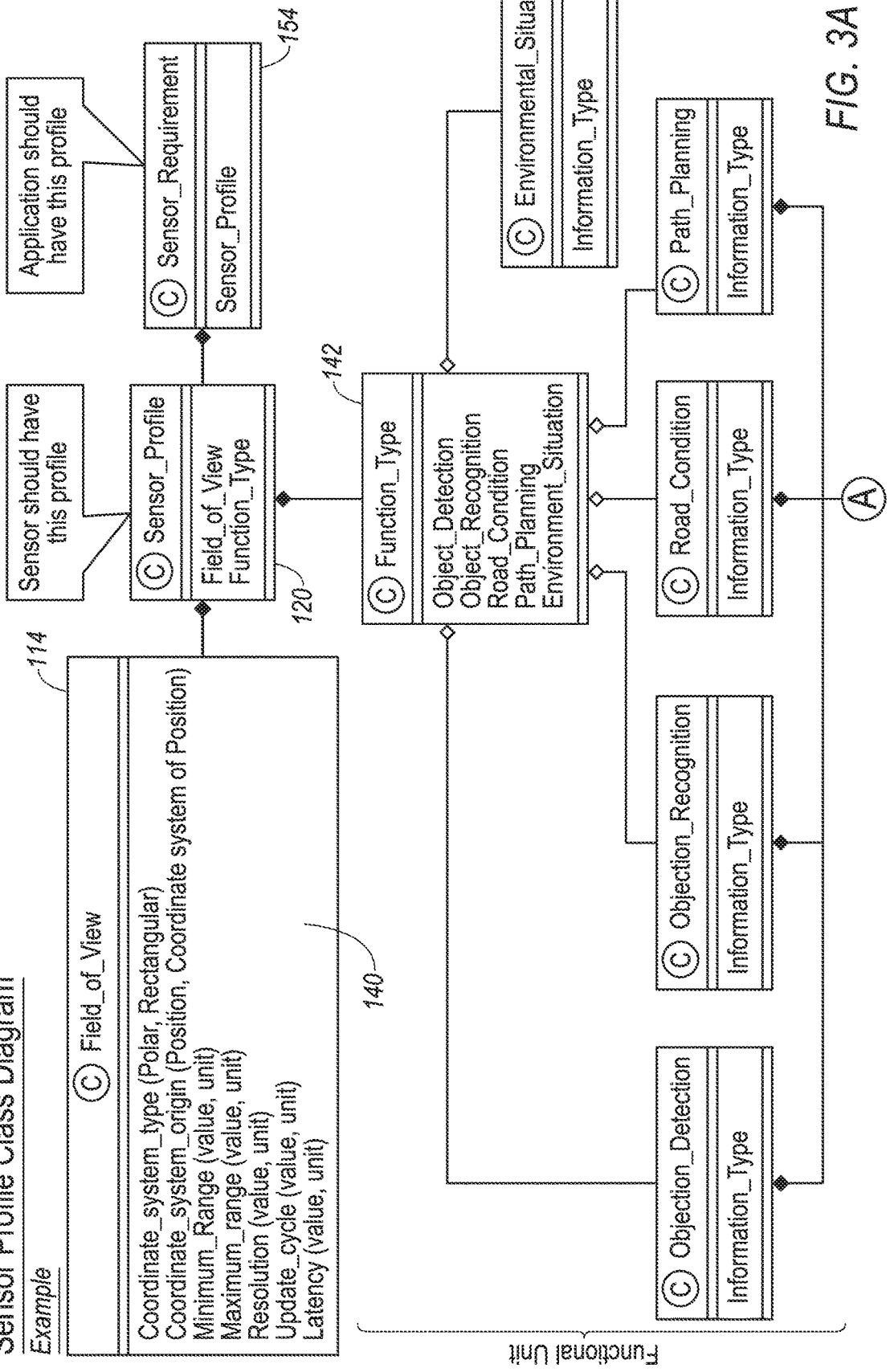
FIGS. 3A and 3B illustrate an example block diagram illustrating a sensor profile.
Figure 3B:
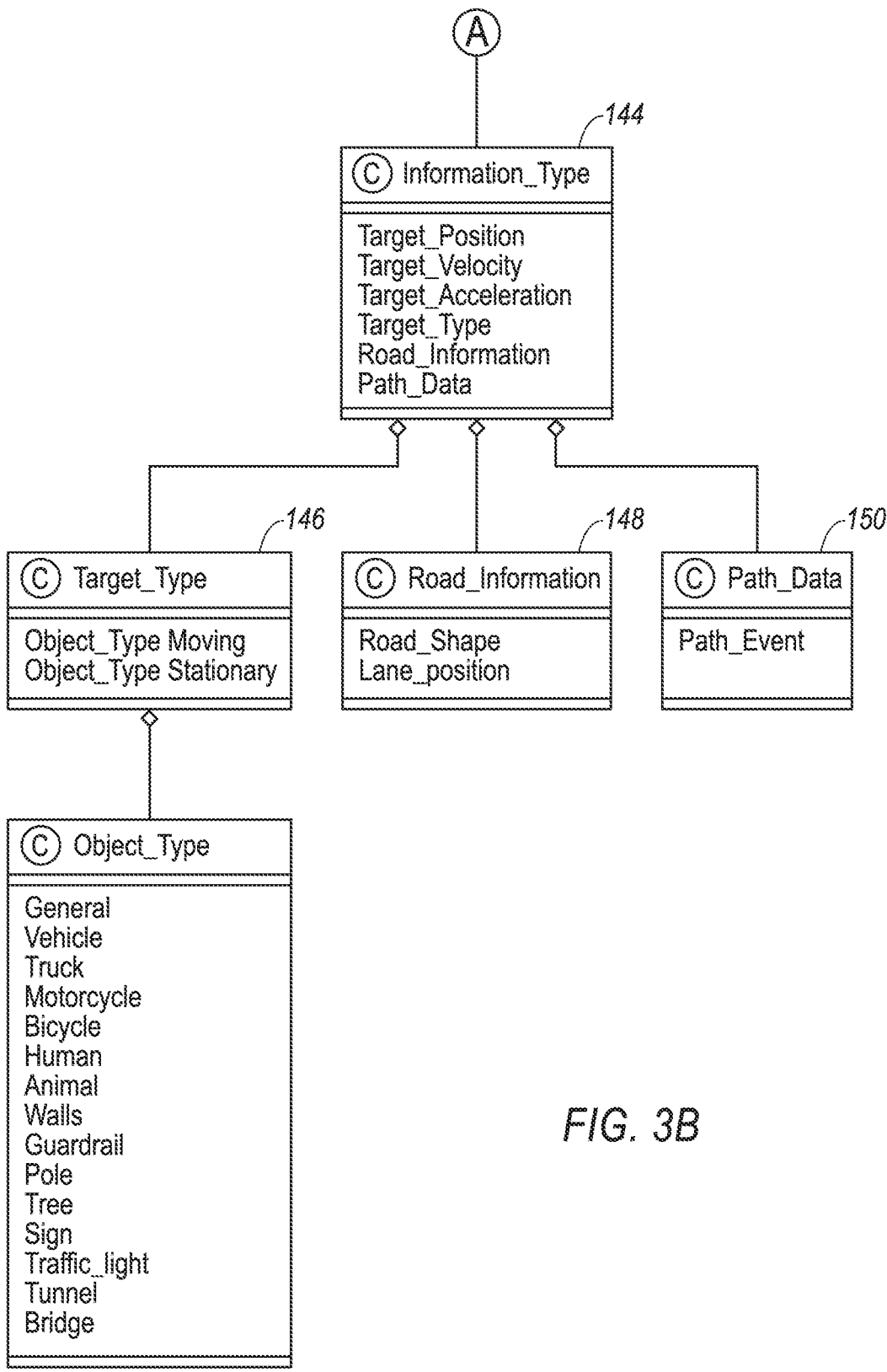

FIG. 3 illustrates an example block diagram illustrating the sensor profile 120. The sensor profile 120 may include sensor factors related to the sensor such as the type of data provided by the sensor 108. In this example, the sensor profile 120 may include a field of view 114 and a function type 142. The field of view 114 may include field of view attributes 140 such as a coordinate system type, coordinate system origin, minimum and maximum range, resolution, cycle refresh, latency, etc.

The function type 142 may indicate the type of function or vehicle feature data provided by the sensor 108. For example, the function type may be object detection and recognition, road condition, path planning, environmental situation planning, etc.

Each of the function types 142 may include one or more information types 144 such as a target position, velocity, acceleration, type 146, road information 148 and path data 150. The information type 144 may indicate what the sensor is detecting. As illustrated in FIG. 3, the target type 146 may include a determination as to whether the object is moving or stationary, as well as the object type 152. The object type 152 may include information as to the type of object. The object type may include specific object that the vehicle 102 may be in close proximity to a vehicle, truck motorcycle, bicycle, human, animal, wall, guardrail, pole, tree, sign, traffic light, tunnel, bridge, etc. The road information 148 may include road shape and lane position. The path data 150 may include a path event.

The application 110 may associate a sensor requirement 154 for each sensor 108. The sensor requirement may be the specific profile attribute that is required to perform the function or feature of the failed sensor. While the sensor profile 120 for each sensor 108 may include various attributes, only a subset of these attributes may be required for certain functions. In one example, the failed sensor, such as the first sensor 108a, may include a required attribute such as the field of view. Thus, any sensor 108 that may replace or provide data in lieu of the data being supplied by the first sensor 108a, may also be required to have the field of view attribute.

In the example of the field of view attribute, the application 110 may determine whether a second sensor 108 may provide the appropriate data to replace the failed first sensor 108a based on the field of view of that sensor. For example, the field of view of the first sensor 108a and the second sensor 108b may 'overlap' in certain areas. If the field of view of the second sensor 108b overlaps with at least a predefined percentage of the failed first sensor 108a, then the application 110 may determine that the second sensor 108b includes the required attribute of the first sensor 108a and may therefore be used to provide the vehicle feature that would otherwise be provided by the failed first sensor 108a.

The predefined percentage may be approximately ten percent. The predefined percentage may apply to each of a coordinate set, minimum range, and maximum range.

Furthermore, each sensor profile 120 may define attribute priorities, such as a priority of a required attributes. For example, a field of view attribute may be of a higher priority than another attribute, such as function type. Sensors 108 that provide the field of view attribute may be selected for use above sensors that do not provide this attribute. The priority may be used to generate match scores among the sensors 108 in determining which sensor should replace the data of the failed sensor.

Figure 4:
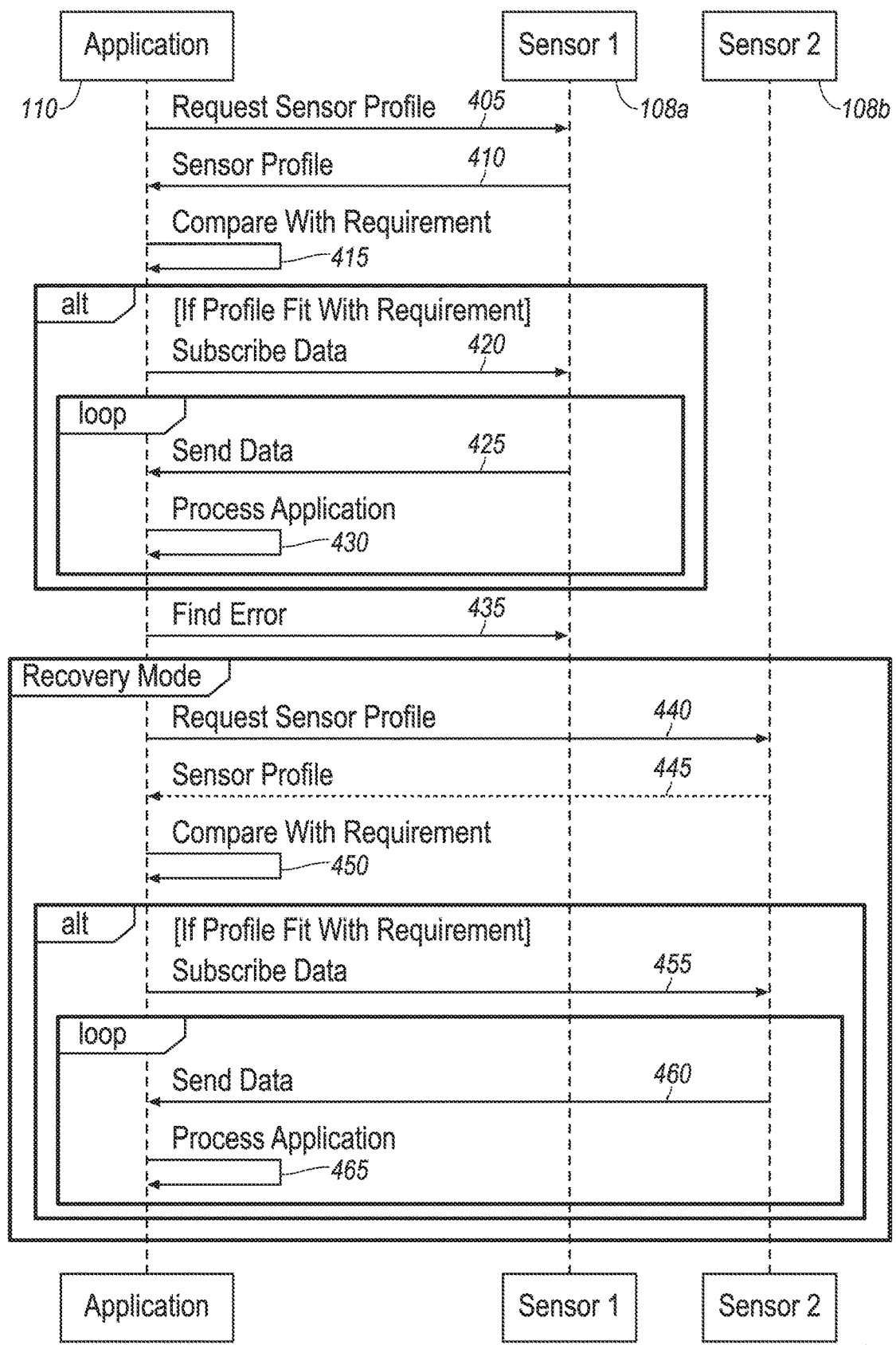
FIG. 4 illustrates an example process of the ADAS of FIG. 1.

FIG. 4 illustrates an example process 400 of the ADAS 100. The process 400 may be carried out by the controller 114. The process 400 may also be performed by another processor or controller either within the vehicle 102 or remote from the vehicle.

The process 400 includes communication between the application 110 and the sensors 108. The application may request a sensor profile from the first sensor 108a at 405. The first sensor 108a may transmit the first sensor profile 120a to the application 110 at 410.

The application 110 may compare the first sensor profile 120a with the required attribute at 415. If the first sensor profile 120a includes the required attribute, the application 110 may transmit subscription data to the first sensor 108a at 420. The first sensor 108a may then transmit sensor data back to the application 110 at 425. The application 110 may continue to operate under normal conditions at 430 until an error is recognized at 435.

The system 100 may enter a recovering mode at 440. At 440, the application 110 may request a sensor profile from a subsequent sensor, in this example, the second sensor 108b. The second sensor 108b may transmit the sensor profile associated with the second sensor 108b to the application at 445.

At 450, the application 110 may compare the second sensor profile with the first sensor profile. The application 110 may determine whether a sensor requirement of the first sensor 108a matches with a sensor attribute of the second sensor 108b. If so, the application may transmit subscription data to the second sensor 108b at 455.

In response to receiving the subscription data at 455, the second sensor 108b may transmit the sensor data to the application 110 at 460. The application 110 may continue to operate under normal conditions at 465 until the sensor data is no longer required.

Figure 5:
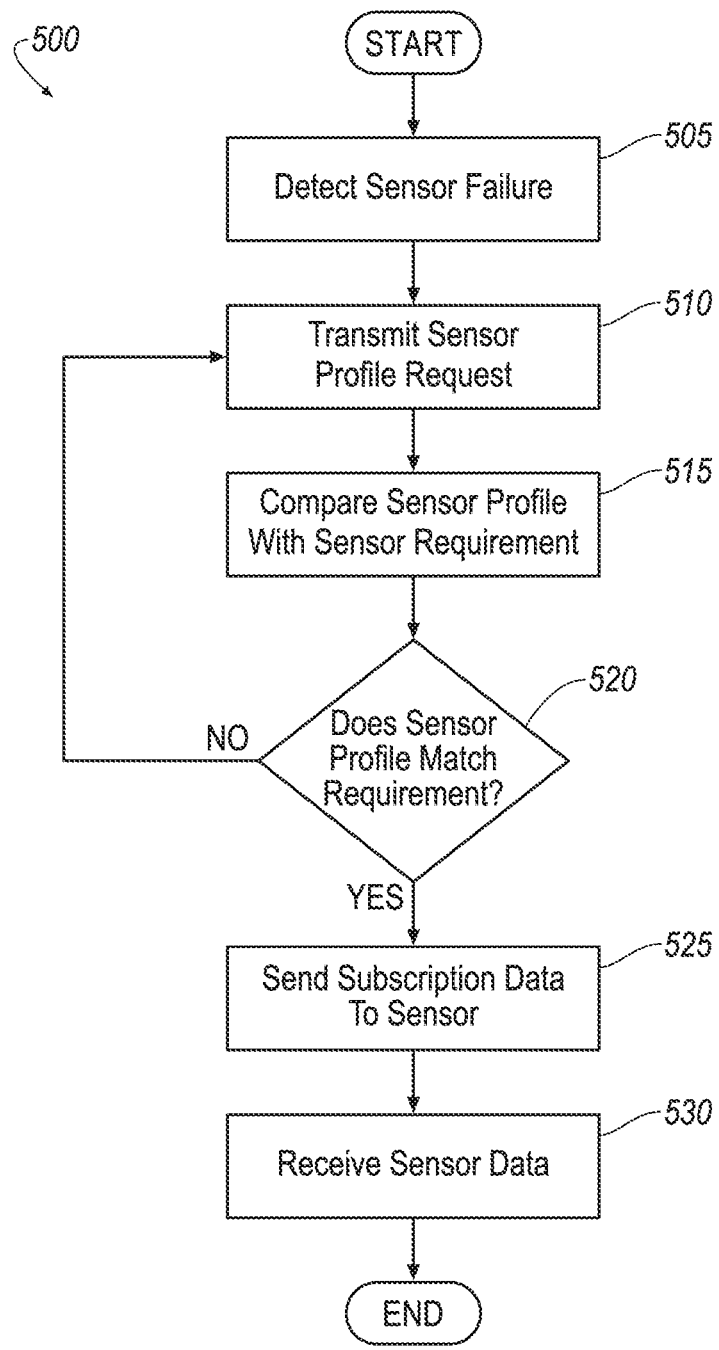
FIG. 5 illustrates an example process for the ADAS of FIG. 1 for managing the multiple sensors in the event of a sensor failure.

FIG. 5 illustrates an example process 500 for the ADAS system 100 for managing the multiple sensors 108 in the event of a sensor failure. The process 500 may begin at block 505 where the controller 112 of the application 110 receives an indication that one of the sensors 108 has failed.

At block 510, the controller 112 may transmit a sensor profile request to a subsequent sensor 108 such as one of the sensor 108 other than the failed sensor 108.

At block 515, the controller 112 may compare the sensor profile of the subsequent sensor 108 with that of the sensor requirement. As explained above, the sensor requirement may be a sensor attribute that is necessary present in a sensor profile for the sensor data to be capable of fulfilling the at least one vehicle function or feature, such as park assist, etc.

At block 520, the controller 112 may determine whether the sensor profiles include the requirement attribute. If so, the process 500 proceeds to block 525. If not, the process 500 proceeds to block 510 where the controller 112 may transmit a sensor profile request to another sensor 108. At block 525, the controller 112 may send a subscription request to the sensor 108. At block 530, the controller 112 may receive sensor data from the subsequent sensor 108. The process may then end at 535.

Figure 6:
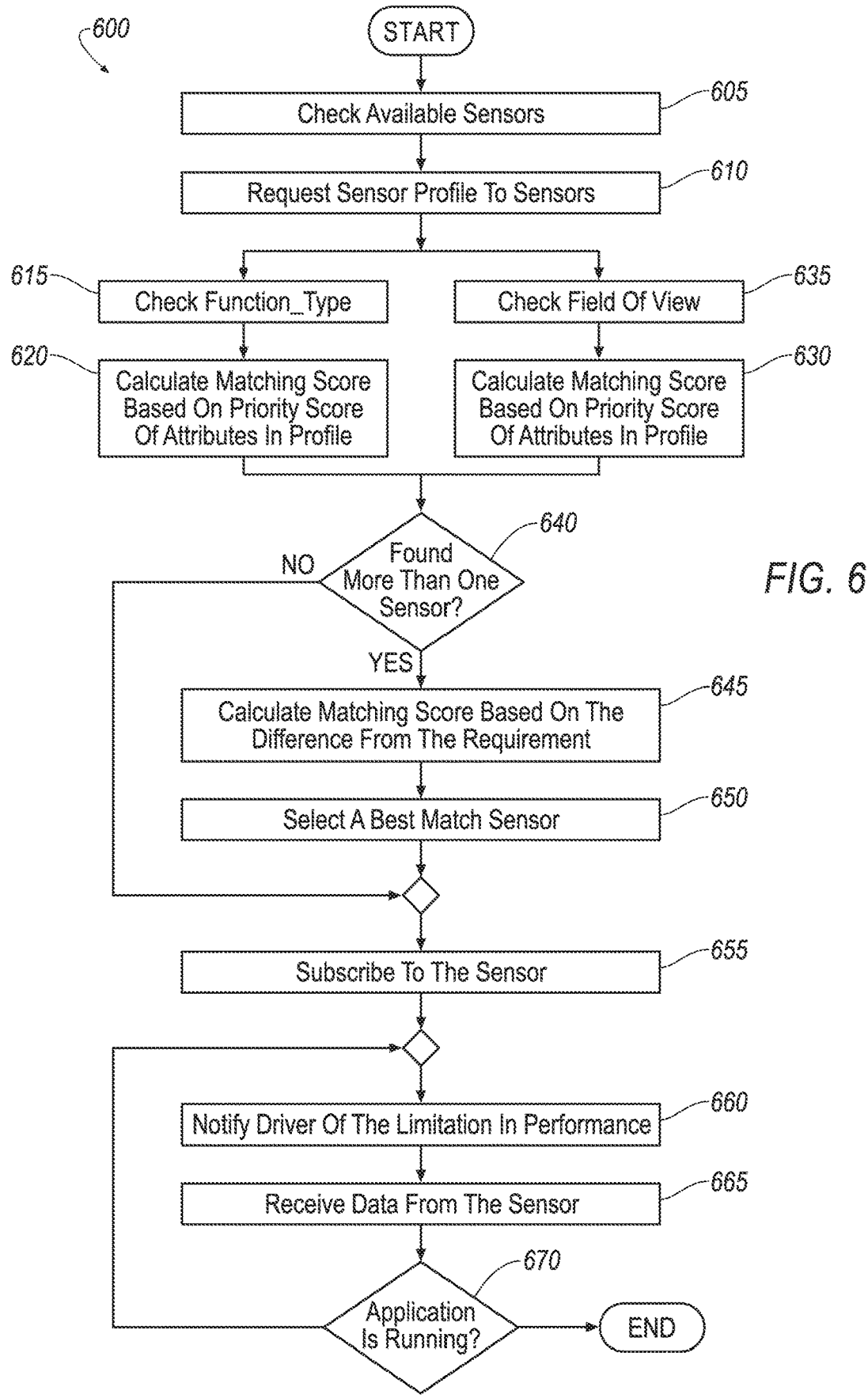
FIG. 6 illustrates a more detailed process for an ADAS for managing the multiple sensors in the event of a sensor failure.

FIG. 6 illustrates a more detailed process 600 for the ADAS 100 for managing the multiple sensors 108 in the event of a sensor failure. The process 600 may begin at block 605 where the controller 112 may check available sensors 108 upon realization of a failure of at least one of the sensors 108, such as the first sensor 108. At block 610, the controller 112 may transmit a request to the sensors 108 requesting their associated sensor profiles 120. Additionally or alternatively, the controller 112 may transmit this request to the memory, which may maintain a database of the sensor profiles.

At block 615, the controller 112 may check the function type 142 of each of the sensor profiles 120. That is, the controller 112 may check each sensor profile 120 to determine whether any of the sensor profiles 120 includes the function type of the failed sensor 108a. If so, at block 620, the controller calculates a matching score based the priority score of attributes in the sensor profile 120. For example, the matching score may be a weighted score depending on the priority of the function type attribute within the sensor profile of the failed sensor. If the sensor prolife 120 of the failed sensor 108a prioritizes the function type above all other attributes, a matched function type may be weighted and scored higher than that of a matched field of view.

Similar to blocks 615 and 620, blocks 625 and 630, respectively, may query the sensor profiles 120 for the field of view attribute. Again, at block 630, the matching score may depend on the priority score of the field of view attribute of the failed sensor 108a.

At block 640, the controller 112 may determine whether more than one sensor 108 exists. If so, the process 600 proceeds to block 645. If not, the process 600 proceeds to block 655.

At block 645, the controller 112 calculates a matching score based on the difference from the requirement. At block 650, the controller 112 may select the sensor with the highest matching score. At block 655, the controller 655 may subscribe to the sensor.

At block 660, the controller 112 may transmit a notification to notify the driver of the limitation in performance due to the failed sensor 108a. This notification may be in the form of a visual notification at the display 121, or an audio notification through the vehicle speakers.

At block 665, the controller 112 may receive data from the selected sensor 108b. At block 670, the controller 112 may continue to operate the application 110.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle sensor system for providing data for performance of vehicle features, comprising:
   a plurality of sensors arranged on a vehicle, each sensor having a sensor profile;
   a memory configured to maintain the sensor profile;
   a controller in communication with the plurality of sensors and memory and configured to:

receive data from each of the plurality of sensors to provide at least one vehicle feature;
detect a failure of a first sensor in which the first sensor fails to provide sensor data necessary to provide the at least one vehicle feature;
use sensor data received from a second sensor to provide the at least one vehicle feature in response to the sensor profile of the second sensor including a required attribute of the first sensor, wherein the required attribute includes one of a sensor field of view and a sensor function;
compare the required attribute of the first sensor with the sensor profile of a third sensor; and
generate a matching score for each of the second sensor and the third sensor.

2. The system of claim 1, wherein the field of view is defined by at least one coordinate set, minimum range, and maximum range.

3. The system of claim 2, wherein the controller is configured to determine that the sensor profile of the second sensor includes the required attribute in response to a required field of view of the first sensor and the field of view of the second sensor aligning by at least predefined percentage for at least one of the coordinate set, minimum range, and maximum range.

4. The system of claim 3, wherein the controller is configured to determine that the sensor profile of the second sensor includes the required attribute in response to the second sensor matching a function type of the first sensor.

5. The system of claim 1, wherein the required attribute includes a function type indicative of at least one of information type and the at least one vehicle feature.

6. The system of claim 1, wherein the matching score for each of the second sensor and the third sensor is based on a degree of match between the required attribute and attributes of the sensor profiles of the second and third sensors.

7. The system of claim 6, wherein the controller is configured to select a sensor associated with the highest matching score and use the sensor data from the selected sensor to provide the at least one vehicle feature.

8. The system of claim 1, wherein the required attribute includes a plurality of required attributes and the sensor profile of the first sensor defines an attribute priority for prioritizing sensor attributes.

9. The system of claim 8, wherein the controller is further configured to assign a matching score to each of the matched attributes between the required attributes and the attributes of the second sensor based on the attribute priority.

10. A non-transitory computer-readable medium tangibly embodying computer readable instructions for a software program, the software program being executable by a processor of a computing device to provide operations comprising:
receiving receive data from each of a plurality of sensors to provide at least one vehicle feature;
detecting a failure of a first sensor in which the first sensor fails to provide sensor data necessary to provide the at least one vehicle feature;
use sensor data received from a second sensor to provide the at least one vehicle feature in response to the sensor profile of the second sensor including a required attribute of the first sensor, wherein the required attribute includes a plurality of required attributes and the sensor profile of the first sensor defines an attribute priority for prioritizing sensor attributes.

11. The medium of claim 10, wherein the required attribute includes one of a sensor field of view and a sensor function and wherein the field of view is defined by at least one coordinate set, minimum range, and maximum range.

12. The medium of claim 11, further comprising determining that the sensor profile of the second sensor includes the required attribute in response to a required field of view of the first sensor and the field of view of the second sensor aligning by at least predefined percentage for at least one of the coordinate set, minimum range, and maximum range.

13. The medium of claim 10, wherein the required attribute includes a function type indicative of at least one of information type and the at least one vehicle feature.

14. The medium of claim 13, wherein further comprising determining that the sensor profile of the second sensor includes the required attribute in response to the second sensor matching the function type of the first sensor.

15. The medium of claim 10, further comprising comparing the required attribute of the first sensor with the sensor profile of a third sensor, and generating a matching score for each of the second sensor and the third sensor.

16. The medium of claim 15, wherein the matching score for each of the second sensor and the third sensor is based on a degree of match between the required attribute and the attributes of the sensor profiles of the second and third sensors, and selecting a sensor associated with the highest matching score and use the sensor data from the selected sensor to provide the at least one vehicle feature.

17. A method for providing data from sensors of a vehicle, comprising:
receiving receive data from each of a plurality of sensors in order to provide at least one vehicle feature;
detecting a failure of a first sensor in which the first sensor fails to provide sensor data necessary to provide the at least one vehicle feature;
compare a required attribute of the first sensor with a sensor profile of a second sensor;
use sensor data received from the second sensor to provide the at least one vehicle feature in response to the sensor profile of the second sensor including the required attribute of the first sensor;
compare the required attribute of the first sensor with the sensor profile of a third sensor; and
generate a matching score for each of the second sensor and the third sensor.

* * * * *